US010899665B2

(12) United States Patent
Bertin et al.

(10) Patent No.: US 10,899,665 B2
(45) Date of Patent: Jan. 26, 2021

(54) HYDROPHOBIC CONSTRUCTION MATERIAL

(71) Applicant: IMERTECH SAS, Paris (FR)

(72) Inventors: Emmanuel Bertin, Tournefeuille (FR); Christel Careme, Mondouzil (FR); Erik Van Dijinen, VW Weert (NL); Anabelle Huguette Reneé Legrix, St Austell Cornwall (GB); Lesley Jane Trewolla, Lostwithiel Cornwall (GB); Neil Treat, San Jose, CA (US); Jarrod Hart, Truro Cornwall (GB); Scott Glover, San Jose, CA (US)

(73) Assignee: ImerTech SAS, Paris (FR)

( * ) Notice: Subject to any disclaimer, the term of this patent is extended or adjusted under 35 U.S.C. 154(b) by 103 days.

(21) Appl. No.: 16/311,919

(22) PCT Filed: Jun. 30, 2017

(86) PCT No.: PCT/EP2017/066310
§ 371 (c)(1),
(2) Date: Dec. 20, 2018

(87) PCT Pub. No.: WO2018/002320
PCT Pub. Date: Jan. 4, 2018

(65) Prior Publication Data
US 2019/0210918 A1 Jul. 11, 2019

(30) Foreign Application Priority Data
Jun. 30, 2016 (EP) ..................................... 16305816

(51) Int. Cl.
| | | |
|---|---|---|
| C04B 14/18 | (2006.01) | |
| C04B 26/02 | (2006.01) | |
| C04B 28/02 | (2006.01) | |
| C04B 20/00 | (2006.01) | |
| C04B 20/10 | (2006.01) | |
| C04B 40/06 | (2006.01) | |
| C04B 103/00 | (2006.01) | |
| C04B 103/46 | (2006.01) | |
| C04B 111/00 | (2006.01) | |
| C04B 111/60 | (2006.01) | |

(52) U.S. Cl.
CPC ........ *C04B 14/185* (2013.01); *C04B 20/0008* (2013.01); *C04B 20/0036* (2013.01); *C04B 20/1051* (2013.01); *C04B 26/02* (2013.01); *C04B 28/02* (2013.01); *C04B 40/0608* (2013.01); *C04B 2103/0041* (2013.01); *C04B 2103/465* (2013.01); *C04B 2111/00318* (2013.01); *C04B 2111/00637* (2013.01); *C04B 2111/60* (2013.01); *C04B 2201/52* (2013.01)

(58) Field of Classification Search
CPC ... C04B 14/185; C04B 20/00; C04B 20/0036; C04B 20/1051; C04B 26/02; C04B 28/02; C04B 40/0608; C04B 2103/0041; C04B 2103/465; C04B 2111/00318; C04B 2111/00637; C04B 2111/60; C04B 2201/52
See application file for complete search history.

(56) References Cited

U.S. PATENT DOCUMENTS

| | | | |
|---|---|---|---|
| 4,889,747 A | 12/1989 | Wilson | |
| 6,348,536 B1 | 2/2002 | Fourty et al. | |
| 6,617,386 B2 | 9/2003 | Lelli et al. | |
| 7,303,600 B2 * | 12/2007 | Roulston | .................. A61K 8/19 |
| | | | 216/96 |
| 2006/0075930 A1 | 4/2006 | Wang et al. | |
| 2007/0104943 A1 | 5/2007 | D'Souza | |
| 2011/0021663 A1 | 1/2011 | Sacks et al. | |
| 2014/0291582 A1 | 10/2014 | Brunnmair | |
| 2015/0225961 A1 | 8/2015 | Egan et al. | |

FOREIGN PATENT DOCUMENTS

| | | | |
|---|---|---|---|
| WO | WO 2008/118827 A1 | 10/2008 | |
| WO | WO 2013/053635 A1 | 4/2013 | |
| WO | WO-2017144536 A1 * | 8/2017 | ............. A61K 8/025 |

OTHER PUBLICATIONS

Baudet et al., "Comparaison de méthodes d'analyses granulométriques, application du granulomètre à laser à la determination du coefficient de forme des particules," Industrie Minérale—Mines et Carrières—Les Techniques, (1990).
Sil-Cell® Grade Sil-35/34 Typical Characteristics, Jan. 1993, 4 pages.
Sil-Cell® Grade Sil-42/18 Typical Characteristics, Dec. 1996, 2 pages.
International Search Report and Written Opinion dated Sep. 15, 2017, in International Application No. PCT/FR20171066310 (16 pgs.).
Verbilo D G, "Determining the Mechanical Characteristics of Microspheres in Compression", Powder Metallurgy and Metal Ceramics, Springer New York LLC, United States, Ukraine, vol. 54, No. 11, Apr. 14, 2016, pp. 731-737.

* cited by examiner

*Primary Examiner* — Anthony J Green
(74) *Attorney, Agent, or Firm* — Finnegan, Henderson, Farabow, Garrett & Dunner, LLP

(57) ABSTRACT

A construction material, a hydrophobic, optionally multi-cellular, inorganic particulate material for use in the construction material, for example, to improve the crush strength and/or stability of the construction material, a method of making the construction material, constructions comprising the construction material, and a method of improving the stability of a construction material.

6 Claims, 2 Drawing Sheets

HYDROPHOBIC CONSTRUCTION MATERIAL

CLAIM FOR PRIORITY

This application is a U.S. national phase entry under 35 U.S.C. § 371 from PCT International Application No. PCT/EP2017/066310, filed Jun. 30, 2017, which claims the benefit of priority of EP Application No. 16305816.7, filed Jun. 30, 2016, from which these applications claim priority and all of which are incorporated herein by reference.

TECHNICAL FIELD

The present invention is directed a construction material, to a hydrophobic, optionally multi-cellular, inorganic particulate material for use in the construction material, for example, to improve the crush strength and/or stability of the construction material, to a method of making the construction material, to constructions comprising the construction material, and to a method of improving the stability of a construction material.

BACKGROUND OF THE INVENTION

Construction materials are used for a wide range of purposes and there is a continuing consumer demand for construction materials with enhanced properties, for example, enhanced stability.

Construction materials include Exterior Thermal Insulating Composite Systems (ETICS), which are a type of exterior building wall cladding that provide exterior walls with an insulated finished waterproof surface in an integrated composite material system, tile adhesives, joint compounds and wall putties.

There is an ongoing to need to develop new and improved construction materials, for example, to improve their stability, to reduce the weight per packaging unit, to improve workability, and to increase the coverage and reduce the surface density of the product.

SUMMARY OF THE INVENTION

According to a first aspect, the present invention is directed to a construction material comprising hydrophobic, inorganic particulate material, wherein the hydrophobic inorganic particulate material has a crush strength of at least about 1500 kPa and wherein (i) the inorganic particulate is a multi-cellular inorganic particulate material, and/or (ii) the inorganic particulate material has a $d_{10}$ of at least about 50 μm, and/or a $d_{50}$ of at least about 100 μm, and/or a $d_{90}$ of at least about 160 μm, and/or (iii) the inorganic material is a spherical perlite comprising microspheres.

According to a second aspect, the present invention is directed to the use of a hydrophobic, multi-cellular, inorganic particulate material having a crush strength of at least 1500 kPa, or as defined in the first aspect, in a construction material.

According to a third aspect, the present invention is directed to the use of a hydrophobic, multi-cellular, inorganic particulate material having a crush strength of at least 1500 kPa, or as defined in the first aspect, for improving the stability of a construction material.

According to a fourth aspect, the present invention is directed to a hydrophobic, multi-cellular, inorganic particulate material as defined in the first aspect.

According to a fifth aspect, the present invention is directed to a method of making a construction material comprising combining a hydrophobic, multi-cellular, inorganic particulate material having a crush strength of at least 1500 kPa, or an inorganic particulate as defined in the first aspect, with one or more further components of the construction material, and forming the construction material therefrom.

According to a sixth aspect, the present invention is directed to a construction, for example, building, comprising a construction material according to the first aspect.

According to a seventh aspect, the present invention is directed to the use of a hydrophobic, multi-cellular, inorganic particulate material having a crush strength of at least 1500 kPa in a construction material to enhance resistance to viscosity or density changes over time, for example, over a 28 day period.

According to an eighth aspect, the present invention is directed to a method of improving the stability of a construction by reducing viscosity or density change over a period of time, for example, 28 days, the method comprising incorporating a hydrophobic, multi-cellular, inorganic particulate material having a crush strength of at least 1500 kPa in the construction material.

DETAILED DESCRIPTION OF THE INVENTION

Figure 1:
FIG. 1 is a SEM of a multi-cellular expanded perlite particulate.

The term "construction material" used herein refers to a material used in the process of making, building, attaching, fabricating and/or decorating a structure or building or an element thereof. For example, construction material may refer to any type of material used in Exterior Thermal Insulating Composite Systems (ETICS) (also sometimes referred to as Exterior Insulation and Finish System (EIFS)), tile adhesives, paints and paint compositions, architectural coatings, stuccos, synthetic stuccos, wall putties, joint compounds and any other applications in which construction materials may be used. Construction material may comprise or consist essentially of any of the following types of materials used in construction: ceramics, sand, gravel, papers, plastics, metals, glass, foams, fabrics, concretes, daub, cement composites, fired bricks, plaster, clay blocks, adhesives, for example tile adhesives, cladding, wall putties, ETICS basecoat layers, joint compounds, paints, paint applications, coatings, and the like.

The term "hydrophobic" is used herein to refer to the segregation and apparent repulsion between water and a surface of the inorganic particulate material. A "hydrophobic coating", as used herein, refers to a coating which imparts such properties to the inorganic particulate. A hydrophobic inorganic particulate has a lower water absorption (i.e., absorbs less water) compared to a non-hydrophobic inorganic particulate or the inorganic particulate absent a hydrophobic coating. In certain embodiments, the hydrophobic inorganic particulate does not absorb water. In certain embodiments, the hydrophobic inorganic particulate has a water absorption of less than about 40 ml/100 ml, for example, less than about 35 ml/100 ml, or less than about 30 ml/100 ml, or less than about 25 ml/100 ml, or less than about 20 ml/100 ml, or less than about 15 ml/100 ml, or less than about 10 ml/100 ml, or less than about 5 ml/100 ml, or less than about 1 ml/100 ml. In certain embodiments, the hydrophobic inorganic particulate is characterized by a hydrophilicity index in which lower values indicate greater hydrophobic character. Details of the measurement and calculation of hydrophilicity index are given below. In certain embodiments, the inorganic particulate, optionally coated with a hydrophobic coating, has a hydrophilicity index of less than about 0.30, for example, equal to or less than about 0.25, or equal to or less than about 0.20, or equal to or less than about 0.15, or equal to or less than about 0.10, or equal to or less than about 0.075, or equal to or less than about 0.05, or equal to or less than about 0.025. In certain embodiments, the hydrophilicity index is equal to or greater than about 0.01. In certain embodiments, the hydrophilicity index is from about 0.01 to about 0.25, for example, from about 0.05 to about 0.25, for example, from about 0.075 to about 2.5, or from about 0.075 to about 0.20, or from about 0.075 to about 0.15, or from about 0.075 to about 0.125.

In certain embodiments, the inorganic particulate material comprises, or is formed of, or consists essentially of, or consists of, particulates having a multi-cellular structure. Such a particulate may be referred to as a multi-cellular inorganic particulate material. In certain embodiments, the term 'multi-cellular' refers to a particulate being formed of multiple, fused cells or parts thereof, in which each cell defines a void space partially or entirely surrounded by a wall of glassy material, usually formed from expansion of the inorganic particulate material when in a softened state. A multi-cellular honeycomb structure refers to a multi-cellular structure having a honeycomb-like (i.e., approximating to) arrangement of cells. In certain embodiments, multi-cellular means, on average, at least 6 cells and/or partial cells per particle, or at least 8 cells and/or partial cells per particle, or at least 10 cells and/or partial cells per particle, or at least 12 cells and/or partial cells per particle. Without being bound by theory, it is believed that a multi-cellular structure is able to disperse a point force more effectively than inorganic particulate comprising particles formed of fewer cells or not having a multi-cellular structure, giving a higher crush strength.

Surprisingly, it has been found that the hydrophobic, optionally multi-cellular, inorganic particulate materials described herein having a crush strength of at least about 1500 kPa may be utilised in a construction material to produce a relatively lightweight construction material with advantageous properties, such as crush strength and stability. For example, it has been surprisingly found that hydrophobic, optionally multi-cellular, inorganic particulate material having a crush strength of greater than about 1500 kPa may be added to a basecoat layer of ETICS coatings, producing a relatively lightweight basecoat having enhanced stability such as, for example, a desirable viscosity or density profile over time. Further, it has been surprisingly found that a hydrophobic, optionally multi-cellular, inorganic particulate material having a crush strength of greater than about 1500 kPa may be added to tile adhesives, wall putties, joint compounds, and the like, to produce tile adhesives, wall putties and joint compounds having advantageous properties. In particular, such use can reduce the weight per packaging unit of ready to use and ready to mix tile adhesives, wall putties and joint compounds without adversely affecting and even improving the workability, coverage and surface density of such construction materials.

In certain embodiments, the present invention is directed to a construction material comprising hydrophobic inorganic particulate material, wherein the inorganic particulate material has a crush strength of at least about 1500 kPa, wherein the inorganic particulate material is a multi-cellular inorganic particulate and/or has one or more of a $d_{10}$ of at least about 50 µm, a $d_{50}$ greater than about 100 µm, and a $d_{90}$ greater than about 160 µm.

In certain embodiments, the present invention is directed to a construction material comprising hydrophobic, multi-cellular inorganic particulate material (optionally having a multi-bubble honeycomb structure), wherein the inorganic particulate material has a crush strength of at least about 1500 kPa.

In certain embodiments, the present invention is directed to a construction material comprising hydrophobic inorganic particulate material, wherein the inorganic particulate material has a crush strength of at least about 1500 kPa, and has one or more of a $d_{10}$ of at least about 50 µm, a $d_{50}$ greater than about 100 µm, and a $d_{90}$ greater than about 160 µm.

In certain embodiments, the inorganic particulate material is selected from the group consisting of perlite, vermiculite, alumina, nepheline and mixtures thereof.

In certain embodiments, the inorganic particulate material comprises, consists essentially of, or consists of: (i) perlite; or (ii) alumina; or (iii) vermiculite; or (iv) nepheline.

In certain embodiments, the inorganic particulate material comprises, consists essentially of, or consists of perlite.

In certain embodiments in which the inorganic particulate material comprises, consists essentially of, or consists of, perlite, the perlite may be substantially spherical perlite. By "substantially spherical" is meant that individual particles of the inorganic particulate material have a generally (but not necessarily geometrically regular) spherical, spheroidal and/or ovoidal morphology, i.e., generally non-angular, as viewed using an optical microscope (e.g., a Keyence VHX-1000). For example, a substantially spherical particle may have a roundness of 1.15 or less, or 1.10 or less, or 1.05 or less. The roundness of a particulate may be determined in accordance with the following method. An image of the particulate sample is taken using an optical microscope (e.g., a Keyence VHX-100) on a contrasting background. The image is then transferred and opened using Leica LAS Image Analysis Software by Leica Microsystems, Solms, Germany (see: http://www.leica-microsystems.com/products/microscope-software/materials-sciences/details/product/leica-las-image-analysis/downloads/). A sample of about 100 particles is then drawn around and the roundness calculated by the software.

In certain embodiments, the perlite is expanded perlite. Typically, expanded perlite includes one or more cells, or parts of cells, in which a cell is a void space partially or entirely surrounded by walls of glass, usually formed from expansion of gases when the glass is in the softened state.

Processes for expanding perlite are well known in the art, and include heating perlite in air to a temperature of least about 700° C., typically between 800° C. and 1100° C., in an expansion furnace. Exemplary processes for producing expanded perlite are described in US-A-20060075930, the entire contents of which is hereby incorporated by reference. Expanded perlite typically has a bulk volume up to 20 times that of the unexpanded material. In certain embodiments, the substantially spherical perlite is expanded perlite.

In certain embodiments, the perlite is in the form of microspheres. The microspheres may be hollow or solid. In certain embodiments, the microspheres are hollow, for example, substantially closed and hollow. In certain embodiments, the microspheres are substantially closed cell structures, e.g., sealed cavities normally filled with air. In certain embodiments, the microspheres have a multi-cellular structure as described above and exemplified in FIG. 1. In certain embodiments, at least 50 wt. % of the perlite is in the form of microspheres, for example, at least about 60 wt. %, or at least about 70 wt. %, or at least about 80 wt. %, or at least about 90 wt. %, or at least about 95 wt. %, or at least about 99 wt. %, or substantially 100 wt. % of the perlite is in the form of microspheres. Perlite in the form of microspheres can be formed in accordance with the methods described in WO-A-2013053635, the entire contents of which is hereby incorporated by reference. Generally, in this process, perlite ore and propellant is fed into an upright furnace and falls along a drop section through multiple heating zones in a furnace shaft of the furnace. The perlite ore is heated to a critical temperature at which the surfaces of the perlite plasticize and perlite grains are expanded on the basis of the propellant. Without being bound to any theory, it is believed that the improved crush strength of the inorganic particulate material is at least in part attributable to the more controlled expansion process described above.

In certain embodiments, the perlite, be it spherical, expanded, expanded spherical or expanded microspherical, is not milled, i.e., the perlite is not an expanded milled perlite.

In certain embodiments, the inorganic particulate material has a $d_{90}$ of no greater than about 500 µm, for example, no greater than about 475 µm, or no greater than about 450 µm, or no greater than about 425 µm, or no greater than about 400 µm, or no greater than about 375 µm, or no greater than about 365 µm. In certain embodiments, the inorganic particulate material has a $d_{90}$ of at least about 100 µm, for example, a least about 125 µm, or at least about 150 µm, or at least about 160 µm, or at least about 175 µm, or at least about 200 µm, or at least about 250 µm.

In certain embodiments, the inorganic particulate material has a $d_{10}$ of at least about 50 µm, for example, at least about 60 µm, or at least about 70 µm, or at least about 75 µm, or at least about 80 µm, or at least about 90 µm, or at least about 100 µm. In certain embodiments, the inorganic particulate material has a $d_{10}$ of from about 50 µm to 150 µm, for example, from about 70 µm to 130 µm, or from about 80 µm to 110 µm. In certain embodiments the inorganic particulate material has a $d_{10}$ of less than about 150 µm, for example, less than about 120 µm, or less than about 110 µm.

In certain embodiments, the inorganic particulate material has a $d_{50}$ of at least about 100 µm, for example, at least about 125 µm, or at least about 130 µm, or at least about 140 µm, or at least about 150 µm. In certain embodiments, the inorganic particulate material has a $d_{50}$ of from about 50 µm to 300 µm, for example, from about 125 µm to 270 µm, or from about 150 µm to 250 µm. In certain embodiments the inorganic particulate material has a $d_{50}$ of less than about 300 µm, for example, less than about 270 µm, or less than about 250 µm.

Unless otherwise specified, the particle size properties referred to herein for the inorganic particulate materials are as measured by the well-known conventional method employed in the art of laser light scattering, using a CILAS 1064L particle size analyser, as supplied by CILAS (or by other methods which give essentially the same result). In the laser light scattering technique, the size of particles in powders, suspensions and emulsions may be measured using the diffraction of a laser beam, based on an application of Fraunhofer theory. Such a machine provides measurements and a plot of the cumulative percentage by volume of particles having a size, referred to in the art as the 'equivalent spherical diameter' (e.s.d), less than given e.s.d values.

The mean particle size $d_{50}$ is the value determined in this way of the particle e.s.d at which there are 50% by volume of the particles which have an equivalent spherical diameter less than that $d_{50}$ value. The chip value is the value at which 10% by volume of the particles have an e.s.d less than that chip value. The $d_{90}$ value is the value at which 90% by weight of the particles have an e.s.d less than that $d_{90}$ value. The $d_{100}$ value is the value at which 100% by volume of the particles have an e.s.d less than that $d_{100}$ value. The $d_0$ value is the value at which 0% by volume of the particles have an e.s.d less than that $d_0$ value. Thus, the do measurement provides a measure of the smallest particles in any given sample (within the limits of measurement of the particle size analyzer).

Crush strength is a measure of the pressure required to crush a bed of inorganic particulate material, held within a steel die set, by 30% of its original volume, and may be determined in accordance with the method described below in the testing methods section.

The inorganic particulate material, which may comprise, consist essentially of, or consist of microspheres of expanded spherical perlite, has a crush strength greater than about 1500 kPa, for example, greater than about 1600 kPa, or greater than about 1700 kPa, or greater than about 2000 kPa. In certain embodiments, the inorganic particulate material, which may comprise, consist essentially of, or consist of microspheres of expanded spherical perlite, has a crush strength of from about 1500 kPa to about 5500 kPa, optionally about 1500 to about 5000 kPa, optionally about 1500 to about 4200 kPa, optionally about 1700 to about 5500 kPa, optionally about 2000 kPa to about 5500 kPa, optionally about 2000 kPa to about 4000 kPa. In certain embodiments, the inorganic particulate material has a crush strength of no greater than about 5250 kPa, or no greater than about 5000 kPa.

In certain embodiments, the inorganic particulate material, for example, perlite, has a bulk density of from about 500-1000 g/l, for example, from about 600-1000 g/l, or from about 700-1000 g/l, or from about 800-1000 g/l, or from about 900-1000 g/l, or from about 500-900 g/l, or from about 500-800 g/l, or from about 500-700 g/l, or from about 500-600 g/l, or from about 600-900 g/l. As used herein, the 'bulk density' of a substance is the value obtained when the mass of the substance is divided by its contained volume, after the substance has been subjected to conditions of free pouring. Bulk may density may be determined in accordance with the test method described below in the testing methods section.

In certain embodiments, the inorganic particulate material, for example, perlite, has an apparent density of from about 0.20 g/cm$^3$ to about 1.0 g/cm$^3$, for example, from about 0.40 g/cm$^3$ to about 0.90 g/cm$^3$, or from about 0.50 g/cm$^3$ to about g/cm$^3$ 0.90 g/cm$^3$, or from about 0.60 to about 0.90 g/cm$^3$, or from about 0.60 g/cm$^3$ to about 0.70 g/cm$^3$, or from about 0.70 g/cm$^3$ to about 0.80 g/cm$^3$, or from about 0.80 g/cm$^3$ to 0.90 g/cm$^3$. As used herein, 'apparent density' of the inorganic particulate material is the value obtained when the mass of the dried inorganic particulate is divided by its volume, using water as the displacing medium. Unless stated otherwise, the apparent density of the inorganic particulate is that of an uncoated particulate. Apparent density may be determined in accordance with the test method described below in the testing methods section. Apparent density of a coated hydrophobic inorganic particulate may be determined in the same way, but using isopropanol as the displacing medium.

In certain embodiments, the inorganic particulate comprises, or consists essentially of, or consists of microspheres of expanded spherical perlite and having a $d_{10}$ of at least about 75 µm and a $d_{90}$ of at least about 175 µm, for example, a $d_{10}$ of at least about 80 µm and a $d_{90}$ of greater than about 200 µm. In such embodiments, the inorganic particulate (i.e., perlite) may have an apparent density of from about 0.5 to about 1 g/cm³, for example, from about 0.5 g/cm³ to about 0.9 g/cm³, or from about 0.50 g/cm³ to about 0.90 g/cm³, or from about 0.60 g/cm³ to about 0.90 g/cm³.

Said inorganic particulate may have a $d_{50}$ of from about 150 µm to about 350 µm, for example, from about 150 µm to about 300 µm, or from about 200 µm to about 300 µm, or from about 225 µm to about 275 µm, or from about 240 µm to about 270 µm, or from about 100 µm to about 200 µm, or from about 125 µm to about 200 µm, or from about 150 µm to about 200 µm, or from about 125 µm to about 175 µm.

In certain embodiments, the inorganic particulate (e.g., perlite, for example, multi-cellular perlite) has a $d_{10}$ of from about 80 µm to about 120 µm, a $d_{50}$ of from about 140 µm to about 170 µm, a $d_{90}$ of from about 200 µm to about 230 µm and optionally a $d_{98}$ of less than about 280 µm.

In certain embodiments, the inorganic particulate (e.g., perlite, for example, multi-cellular perlite) has a $d_{10}$ of from about 80 µm to about 120 µm, a $d_{50}$ of from about 170 µm to about 200 µm, a $d_{90}$ of from about 260 µm to about 290 µm and optionally a $d_{98}$ of less than about 350 µm.

In certain embodiments, the inorganic particulate (e.g., perlite, for example, multi-cellular perlite) has a $d_{10}$ of from about 70 µm to about 95 µm, a $d_{50}$ of from about 230 µm to about 260 µm, a $d_{90}$ of from about 350 µm to about 370 µm and optionally a $d_{98}$ of less than about 450 µm.

To reflect the advantageous high strength and light-weighting properties of the construction materials and inorganic particulate described herein, the inorganic particulate may be characterised in terms of a Particle Strength Factor, which is defined as the ratio of the crush strength (in kPa) to the apparent density (in g/cm³) of the inorganic particulate, i.e., particle to its crush strength:

Particle Strength Factor=Crush strength (KPa)/Apparent Density (g/cm³)

For example, an inorganic particulate material having a crush strength of 2000 kPa and an apparent density of 0.50 g/cm³ has a Particle Strength Factor of 4000.

In certain embodiments, the inorganic particulate material has a Particle Strength Factor of 1500 to 8000, for example, when the inorganic particulate material has a crush strength of greater than about 1500 kPa, for example, from about 1000 kPa to about 8000 kPa, or from about 1500 kPa to about 5000 kPa, or from about 1600 kPa to about 4200 kPa. In such embodiments the inorganic particulate material may have a Particle Strength Factor of about 2000 to about 6000, or of about 2000 to about 5000, or of about 2100 to about 4900.

In certain embodiments, the inorganic particulate material has a Particle Strength Factor of 1500 to 8000, for example, when the inorganic particulate material has an apparent density of about 0.50 to about 1.0 g/cm³, for example, from about 0.55 to about 0.95 g/cm³, or from about 0.06 to about 0.90 g/cm³ or from about 0.63 to about 0.86 g/cm³. In such embodiments the inorganic particulate material may have a Particle Strength Factor of about 2000 to about 6000, or of about 2000 to about 5000, or of about 2100 to about 4900.

In certain embodiments, the inorganic particulate material has a Particle Strength Factor of 1500 to 8000, for example, when the inorganic particulate material has a crush strength of greater than about 1500 kPa and an apparent density of about 0.50 to about 1.0 g/cm³, for example, a crush strength of from about 1000 KPa to about 8000 kPa and an apparent density from about 0.55 to about 0.95 g/cm³, or a crush strength of from about 1500 kPa to about 5000 kPa and an apparent density of from 0.6 to about 0.9 g/cm3, or a crush strength of from about 1600 kPa to about 4200 kPa and an apparent density of from about 0.63 to about 0.86 g/cm³. In such embodiments the inorganic particulate material may have a Particle Strength Factor of about 2000 to about 6000, or of about 2000 to about 5000, or of about 2100 to about 4900.

In certain embodiments the inorganic particulate material has a Particle Strength Factor of 1500 to 8000, for example, when the inorganic particulate material has a $d_{10}$ greater than about 75 µm, for example, greater than about 75 µm, or greater than about 80, or greater than about 83 µm, and/or a $d_{50}$ of greater than about 125 µm, for example, greater than about 135 µm, or greater than about 140 µm or greater than about 145 µm, or greater than about 150 µm, and/or a $d_{90}$ of greater than about 175 µm, for example, greater than about 200 µm, or greater than about 210 µm or greater than about 215 µm. In such embodiments the inorganic particulate material may have a Particle Strength Factor of about 2000 to about 6000, or of about 2000 to about 5000, or of about 2100 to about 4900.

In certain embodiments, the inorganic particulate material comprises or is formed of cenospheres having a hydrophobic coating.

In certain embodiments, the inorganic particulate material does not comprise or is not formed of cenospheres.

In certain embodiments, the inorganic particulate does not comprise or is not formed of cenospheres which do not have a hydrophobic coating.

In certain embodiments, the inorganic particulate comprises less than about 5 ppm As and/or less than about 15 ppm Pb, and/or is essentially free of Cd, as may be determined by XRF.

Hydrophobic Coating

In certain embodiments, the hydrophobic, optionally multi-bubble, inorganic particulate material comprises a hydrophobic coating. In certain embodiments, the inorganic particulate material is surface treated with a hydrophobic additive to form the hydrophobic inorganic particulate material. In certain embodiments, the hydrophobic inorganic particulate material comprises, consists essentially of, or consists of perlite which is coated with a hydrophobic coating. In certain embodiments, the hydrophobic inorganic particulate material comprises, consists essentially of, or consists of expanded perlite which is coated with a hydrophobic coating. In certain embodiments, the hydrophobic inorganic particulate material comprises, consists essentially of, or consists of expanded perlite microspheres which are coated with a hydrophobic coating.

In certain embodiments, the hydrophobic coating may cover at least about 50% of the surface area of the inorganic particulate material, for example, at least about 60%, or at least about 70%, or at least about 80%, or at least about 90%, or at least about 95%, or at least about 99%. In certain embodiments, the hydrophobic coating may cover the entire surface area of the inorganic particulate material. In certain embodiments, the inorganic particulate material is coated with a sufficient amount of hydrophobic coating to provide a monolayer coverage of coating about the surface of the inorganic particulate material, for example, in embodiments in which the coating is a fatty acid material. In other embodiments, for example, embodiments in which the coating is a salinizing agent, the coating may form as oligomeric species about the surface of the inorganic particulate material.

The hydrophobic coating may comprise, consist essentially of, or consist of any materials which may impart hydrophobic properties on the inorganic particulate material. For example, the hydrophobic coating may comprise, consist essentially of, or consist of any known substances, for example, alkanes, oils, fats, fatty acids, greasy substances, lubricating materials, which have hydrophobic properties and/or serve to increase the hydrophobicity of the inorganic particulate material. Lubricating materials include, for example, graphite and/or high aspect ratio talc. Without being bound to any theory, the presence of the hydrophobic coating on the inorganic particulate material reduces the water absorption of the inorganic particulate material in comparison to an inorganic particulate material absent any form of hydrophobic coating. In certain embodiments, the hydrophobicity of the inorganic particulate is such that water absorption is not measurable (i.e., the inorganic particulate is incapable of absorbing water).

As used herein, the term "high aspect ratio talc" means a talc particulate having a lamellarity index of greater than about 2.8. The 'lamellarity index' is defined by the following ratio:

$$\frac{d_{mean} - d_{50}}{d_{50}}$$

in which "$d_{mean}$" is the value of the mean particle size ($d_{50}$) obtained by a particle size measurement by wet Malvern laser scattering (standard AFNOR NFX11-666 or ISO 13329-1) and "$d_{50}$" is the value of the median diameter obtained by sedimentation using a Sedigraph (standard AFNOR X11-683 or ISO 13317-3), as described below. Reference may be made to the article by G. Baudet and J. P. Rona, Ind. Min. Mines et Carr. Les techn. June, July 1990, pp 55-61, which shows that this index is correlated to the mean ration of the largest dimension of the particle to its smallest dimension. In certain embodiments, the talc particulate having a lamellarity index of greater than about 2.8 is further characterized by having a $d_{50}$ between about 0.5 and 5 µm, a $d_{95}$ of less than about 15 µm (or less than about 10 µm), a $d_{98}$ of less than about 20 µm (each determined by Sedigraph, as described below), and a specific surface area (BET) of greater than about 10 m$^2$/g.

Exemplary talc particulates having a lamellarity index of greater than about 2.8, and methods for making same, are described in U.S. Pat. No. 6,348,536, the entire contents of which are hereby incorporated by reference.

The addition of graphite and/or high aspect ratio talc may also serve to reduce the abrasiveness of the inorganic particulate and, in turn, the abrasiveness of the construction material.

In certain embodiments, the hydrophobic coating comprises, consists essentially of, or consists of silane, siloxane, for example, silicone oil or silicone emulsion, or combinations thereof. In some embodiments the inorganic particulate material is surface treated with a hydrophobic additive to form the hydrophobic inorganic particulate material, wherein the hydrophobic additive comprises, consists essentially of, or consists of silane, siloxane, for example, silicone oil or silicone emulsion, or combinations thereof. In some embodiments the hydrophobic coating comprises, consists essentially of, or consists of silane, siloxane, for example, silicone oil or silicone emulsion, or combinations thereof. In some embodiments the hydrophobic coating comprises, consists essentially of, or consists of silane, for example, octyltriethoxysilane. In some embodiments, the hydrophobic coating comprises, consists essentially of, or consists of siloxane, for example, silicone. In some embodiments the hydrophobic coating comprises, consists essentially of, or consists of silicone oil or silicone emulsion. In some embodiments the hydrophobic coating comprises, consists essentially of, or consists of silicone oil, for example, polydimethylsiloxane. In some embodiments the hydrophobic coating comprises, consists essentially of, or consists of silicone emulsion, for example, a polydimethylsiloxane emulsion. In some embodiments the hydrophobic coating does not comprise silane.

Silanization agents which are suitable for increasing the hydrophobic properties of the inorganic particulate material, for example expanded perlite microspheres, may be selected from one or more of dimethyldichlorosilane, hexadimethylsilazane, butyltrichlorosilane, hexyltrichlorosilane, octyltrichlorosilane, octylmethyldichlorosilane, decyltrichlorosilane, dodecyltrichlorosilane, tridecyltrichlorosilane, dihexyldichlorosilane, dioctyldichlorosilane, octadecyltrichlorosilane, tributylchlorosilane, or fluorosilane analogues of said chlorosilanes, octyltrialkoxysilanes such as, for example, octyltriethoxysilane and octyltrimethoxysilane, chloropropyltrialkoxysilanes such as, for example, chloropropyltrimethoxysilane and chloropropyltriethoxysilane, polydimethylsiloxane, 3-methacryloxypropyltriethoxysilane, vinyl trialkoxysilanes such as, for example, vinyl trimethoxy silane, vinyl triethoxy silane and vinyl triisopropoxy silane, and mixtures thereof.

In certain embodiments, the hydrophobic coating may be selected from one or more of tetraethoxysilane, methyltrimethoxysilane, methyltrimethoxysilane (HP), methyltriethoxysilane, methyltriethoxysilane (HP), dimethyldimethoxysilane, propyltrimethoxysilane, propyltriethoxysilane, isobutyltrimethoxysilane, isobutyltriethoxysilane, phenyltrimethoxysilane, and octyltriethoxysilane, for example, n-octyltriethoxysilane, In certain embodiments, the hydrophobic coating comprises or consists of octyltriethoxysilane, for example, comprises or consists of n-octyltriethoxysilane.

In certain embodiments, the hydrophobic coating comprises or consists of polydimethylsiloxane. In certain embodiments, the hydrophobic coating comprises or consists of polydimethylsiloxane emulsion.

Any suitable amount of hydrophobic coating may be used in order to render the inorganic particulate hydrophobic or increase its hydrophobicity. In certain embodiments, the amount of hydrophobic coating is from about 0.01 wt. % to about 10 wt. %, based on the total weight of the inorganic particulate material, for example, from about 0.01 wt. % to about 5.0 wt. %, or from about 0.02 wt. % to about 4.0 wt. %, or from about 0.05 wt. % to about 3.0 wt. %, or from about 0.05 wt. % to about 2.0 wt. %, or from about 0.05 wt. % to about 1.0 wt. %, or from about 0.05 wt. % to about 0.5 wt. %, or from about 0.05 wt. % to about 0.25 wt. %, or from about 0.075 wt. % to about 0.2 wt. %, or from about 0.075 wt. % to about 0.15 wt. %, or from about 0.075 wt. % to about 0.125 wt. %, or from about 0.1 wt. % to about 0.15 wt. %. In certain embodiments, for example, embodiments in which the hydrophobic is a silane or combinations thereof, the amount of coating is from about 0.08 wt. % to about 0.2 wt. %, based on the total weight of inorganic particulate material, for example, from about 0.1 wt. % to about 0.15 wt. %. In other embodiments, for example, embodiments in which the hydrophobic coating is silicone oil (e.g., polydimethylsiloxane), silicone emulsion (e.g., polydimethylsiloxane emulsion), or combinations thereof, the amount of coating may be from about 0.05 wt. % to about 1.5 wt. %, based on the total weight of the inorganic particulate material, for example, from about 0.05 wt. % to about 1.0 wt. %, or from about 0.05 wt. % to about 0.75 wt. %, or from about 0.10 wt. % to about 0.5 wt. %, or from about 0.10 wt. % to about 0.25 wt. %, or from about 0.10 wt. % to about 0.20 wt. %, or from about 0.5 wt. % to about 1.5 wt. %, based on the total weight of inorganic particulate material, for example, from about 0.8 wt. % to about 1.2 wt. %.

In certain embodiments, the hydrophobic inorganic particulate material is characterized by a hydrophilicity index in which lower values indicate greater hydrophobic character. Details of the measurement and calculation of hydrophilicity index are given below. In certain embodiments, the inorganic particulate material, optionally coated with a hydrophobic coating, has a hydrophilicity index of less than about 0.30, for example, equal to or less than about 0.25, or equal to or less than about 0.20, or equal to or less than about 0.15, or equal to or less than about 0.10, or equal to or less than about 0.075, or equal to or less than about 0.05, or equal to or less than about 0.025. In certain embodiments, the hydrophilicity index is equal to or greater than about 0.01. In certain embodiments, the hydrophilicity index is from about 0.01 to about 0.25, for example, from about 0.05 to about 0.25, for example, from about 0.075 to about 2.5, or from about 0.075 to about 0.20, or from about 0.075 to about 0.15, or from about 0.075 to about 0.125. In certain embodiments, the hydrophobic inorganic particulate material has a hydrophilicity index of from about 0.01 to about 0.25, for example, from about 0.025 to about 0.20. In such embodiments, the inorganic particulate material is coated with any one or more of the hydrophobic coatings described herein. In certain embodiments, the hydrophobic coating is silane or siloxane. In certain embodiments, the hydrophobic coating is siloxane, for example, a silicone oil such as, for example, polydimethylsiloxane. In certain embodiments, the hydrophobic coating is polydimethylsiloxane emulsion. In certain embodiments, the hydrophobic coating is silane, for example, octyltriethoxysilane.

The hydrophilicity index is the ratio of the polar surface energy of the hydrophobic inorganic particulate material, $\gamma_P$ (mJ/m$^2$), to the total surface energy, $\gamma_T$ (mJ/m$^2$), of the hydrophobic inorganic particulate material, i.e., $$\text{Hydrophilicity index} = \gamma_P/\gamma_T \quad (1)$$

The hydrophilicity index can be determined in accordance with the following test method, referred to as the 'Hydrophilicity index test method':

The surface energy of the hydrophobic inorganic particulate material is measured using a Surface Energy Analyser (SEA) (Surface Measurements System Ltd., UK) inverse gas chromatography (IGC). The hydrophobic inorganic particulate material sample is packed into individual iGC silanised glass columns with an outside diameter of 6 mm and inside diameter of 4 mm such that the total surface area of the column is about 0.5 m$^2$. The surface energy of each sample is analysed at a 0.0065, 0.01, 0.02, 0.03, 0.05, 0.08, 0.1, 0.12, 0.14, 0.165 fractional surface coverages with both non-polar (hexane, heptane, octane, and nonane) and polar (dichloromethane and ethyl acetate) probe molecules to determine the non-polar surface energy and polar surface energy. The non-polar surface energy and polar surface energy is quantified from the peak maximum retention volume of the probe molecules using the Schultz method and Della Volpe scale. Each experiment is pre-conditioned for 2 hours at 30° C. and 0% RH with 2.5 sccm ultra high purity helium carrier gas. All experiments are conducted at 30° C. with 2.5 sccm total flow rate of helium, and using methane for dead volume corrections. The total surface energy is calculated as the sum of the polar and non-polar surface energies. From this the hydrophilicity index is calculated in accordance with Eq. 1 above.

In certain embodiments, the hydrophobic inorganic particulate material is perlite (including or consisting of any one of the specific perlite materials described herein) coated with about 0.05-0.75 wt. % polydimethylsiloxane emulsion and having a hydrophilicity index of from about 0.025 to about 0.25, for example, from about 0.05 to about 0.20. In such embodiments, the perlite may be in the form of microspheres having a multi-cellular structure as described above and, for example, exemplified in FIG. 1. In such embodiments, the inorganic particulate (e.g., multi-cellular perlite) may have a $d_{10}$ of from about 80 μm to about 120 μm, a $d_{50}$ of from about 140 μm to about 170 μm, a $d_{90}$ of from about 200 μm to about 230 μm and optionally a $d_{98}$ of less than about 280 μm.

In certain embodiments, the hydrophobic inorganic particulate material is perlite (including or consisting of any one of the specific perlite materials described herein) coated with about 0.05-0.75 wt. % octyltriethoxysilane and having a hydrophilicity index of from about 0.20 to about 0.30, for example, from about 0.20 to about 0.25. In such embodiments, the perlite may be in the form of microspheres having a multi-cellular structure as described above and, for example, exemplified in FIG. 1. In such embodiments, the inorganic particulate (e.g., multi-cellular perlite) may have a $d_{10}$ of from about 80 μm to about 120 μm, a $d_{50}$ of from about 140 μm to about 170 μm, a $d_{90}$ of from about 200 μm to about 230 μm and optionally a $d_{98}$ of less than about 280 μm.

The coated inorganic particulate may be prepared by any suitable mixing method, for example, by mixing, optionally under conditions of shear, the hydrophobic coating and inorganic particulate material, followed by any suitable additional steps such as drying.

In certain embodiments, the hydrophobic, multi-cellular inorganic particulate material of the present invention, for example inorganic particulate material with a hydrophobic coating, has enhanced sedimentation properties. In certain embodiments, the amount of sedimentation of the hydrophobic inorganic particulate material, for example, inorganic particulate material with a hydrophobic coating, in an Imhoff sedimentation test, is less than 0.5 mm after 48 hours and/or less than about 5 mm after 672 hours (28 days), for example, less than about 0.2 mm after 48 hours and/or less than about 2 mm after 672 hours, or less than about 0.1 mm after 48 hours and/or less than about 1 mm after 672 hours. In certain embodiments, the amount of sedimentation of the inorganic particulate material having a hydrophobic coating is at least about 50% less, for example, about 60% less, or about 70% less, or about 80% less, or about 90% less, after 24 hours compared to the amount of sedimentation of the inorganic particulate material absent a hydrophobic coating.

The Construction Material

In certain embodiments, the construction material is a wall putty, tile adhesive, joint compound or component (e.g., base layer or base coat) of an ETICS.

The construction material may comprise any suitable amount of hydrophobic, optionally multi-cellular, inorganic particulate material In certain embodiments, the amount of hydrophobic, optionally multi-cellular, inorganic particulate material present in the construction material is an amount of from about 0.1 wt. % to about 40 wt. %, based on the total weight of the construction material, for example, from about 0.1 wt. % to about 30 wt. %, or from about 0.1 wt. % to about 20 wt. %, or from about 0.1 wt. % to about 15 wt. %, or from about 0.1 wt. % to about 10 wt. %, or from about 0.2 wt. % to about 8 wt. %, or from about 0.5 wt. % to about 6 wt. %, or from about 1.0 wt. % to about 5 wt. %, or from about 2 wt. % to about 10 wt. %, or from about 2 wt. % to about 8 wt. %, or from about 2 wt. % to about 6 wt. %, or from about 3 wt. % to about 7 wt. %, or from about 4 wt. % to about 6 wt. %. In certain embodiments, the hydrophobic inorganic particulate material is present in an amount of less than about 50 wt. % of the total weight of the construction material, for example, less than about 40 wt. %, or less than about 30 wt. %, or less than about 20 wt. %, or less than about 15 wt. %, or less than about 10 wt. %, or less than about 8 wt. %.

In certain embodiments the construction material is a component of, or for use in, an ETICS, for example, a base layer or base coat for an ETICS. ETICS is a type of exterior building wall cladding that provides exterior walls with an insulated finished waterproof surface in an integrated composite material system. ETICS are applied to the outside of walls (for example, masonry, concrete) to improve the thermal insulation, and to achieve a number of other beneficial objectives. ETICS can give protection against weathering and also improve the appearance of the buildings.

In certain embodiments, the ETICS comprises adhesive, basecoat, and finishing topcoat. The inorganic particulate material may be present in any one or more of the adhesive, basecoat and finishing topcoat.

In addition to the inorganic particulate material, the ETICS may further comprise a thermal insulation product, adhesives, reinforcements, finishing coats (finishers), primers, reinforcing meshes, and mechanical fixing devices, and any other material known to be used for these purpose or in ETICS systems for other purposes. In certain embodiments, the inorganic particulate material is present in the base coat or base layer of the ETICS. In certain embodiments, there may be multiple base coats/base layers and the inorganic particulate material may be present in only one of the base coats/base layers or it may be present in more than one, or it may be present in all the base coats/base layers. In certain embodiments, the ETICS comprises polymeric material, cementitious material, binders, adhesives (for example, dispersion based adhesives), and the like. In certain embodiments, the ETICS may comprise a dispersion based top coat or a cement render top coat, along with adhesive and base coat mortar. In certain embodiments, the ETICS comprises mineral wool or polystyrene foam insulation. In certain embodiments, the ETICS comprises polymeric binders. In certain embodiments, the ETICS comprises acrylic emulsion polymers, cellulose ethers or polyurethane powder. In certain embodiments, the ETIC additionally comprises a thickener, for example, a cellulose-based thickener or an acrylic-based thickener. The thickener may be present in any suitable amount sufficient to modify the viscosity of the construction material as desire, for example, in an amount up to about 5 wt. %, or up to about 2 wt. %, or up to about 1 wt. %, based on the total weight of the construction material in which the inorganic particulate material is comprised.

In certain embodiments, the construction material is a wall putty or a joint compound. Wall putties are applied to level out uneven surfaces, often walls, and are usually applied in a paste by knife, airless spraying and knife or rolling and knife. After drying sanding is done to smoothen the wall surface and the wall is prepared for application of a decoration layer of any kind. Joint compounds are similar to wall putties, but the application thickness is typically greater. There is also a higher demand for products that avoid shrinkage and undesirable abrupt roughness effects. In certain embodiments the wall putty is a ready to use wall putty. A ready to use wall putty means the formulation does not contain any cement, only polymer as binder. In certain embodiments, the wall putty is a ready to mix wall putty, which means that the wall putty contains cement in addition to the polymer as binder. The wall putty may be formulated for different layer thickness: fine, medium, coarse and spray.

In certain embodiments, the wall putty is prepared as a dry mortar (ready to mix) or as a viscous liquid paste (ready to use). The wall putty may be an acrylic wall putty or a powder wall putty. Acrylic wall putties are typically already in a paste form and so are ready to use, whereas powder wall putties require mixing with water before use. The hydrophobic inorganic particulate material of the present invention may be used as filler in the wall putty. The wall putty may additionally comprise a solvent, a binder and any other material(s) known to be used in wall putties. The solvent may be water and the binder may be a polymeric species, for example, a latex co-polymer. Joint compounds may also be ready to use or ready to mix.

The hydrophobic, optionally multi-cellular, inorganic particulate materials described herein enable the production of a light weight material for ready to mix and ready to use wall putties, which will serve to reduce the weight of a packaging unit. In one embodiment, use of the hydrophobic, optionally multi-cellular, inorganic particulate material may serve to reduce the weight of ready to use or ready to mix wall putties, for example, from 20 kg to 15 kg, whilst maintaining similar or higher coverage ($m^2$/kg|). Moreover, crush strength can be an important property for wall putties, in particular in wall putty spray applications as the material needs to be strong enough to survive compounding in a plant at high pressures.

In certain embodiments the construction material is a tile adhesive. The hydrophobic, optionally multi-cellular, inorganic particulate material may be used for shear intensive construction applications such as ready to use tile adhesives and ready to mix tile adhesives. In certain embodiments, the tile adhesive is a polymer modified dry mortar. The tile adhesive may be for floor and wall tiling.

In certain embodiment, the adhesive is a cement based adhesive, dispersion adhesive or resin adhesive. All may be used for wall as well as floor tiling. Cement based adhesives contain cement and when mixed with water or a polymer enhanced liquid become a ready to mix tile adhesive. Dispersion adhesives are generally ready to use adhesives which come premixed in a bucket. Resin reaction adhesives are adhesives that cure by a single chemical reaction and are either a single component, such as polyurethane adhesives or two or more components such as epoxy adhesives and are typically ready to use adhesives.

In certain embodiments, the tile adhesive is any of the following class of adhesives: normal adhesive, improved adhesive, fast-setting adhesive, adhesive with reduced slip, adhesive with extended open time, deformable adhesive, highly deformable adhesive, or any other adhesive classified in accordance to the EN 12004.

In one embodiments, use of the hydrophobic, optionally multi-cellular, inorganic particulate material serves to reduce the weight of ready to use or ready to mix tile adhesives, for example, from 20 kg to 15 kg whilst maintaining similar or higher coverage (m²/kg). Additional or alternatively, use of the hydrophobic, optionally multi-cellular, inorganic particulate material may provide Pozzolanic reactivity as well as hydrophobicity.

In certain embodiments, the tile adhesive further comprises one or more of re-dispersible powder, methyl cellulose ether, filler such as silica sand and/or calcium carbonate, grey or white cement, and further additives selected from starch ethers, inorganic or organic fibres, air-entraining agents, accelerators, retarders, superplasticizers, defoamers and alumina cements.

In certain embodiments, the tile adhesive is a cementitious tile adhesive. In certain embodiments, the tile adhesive is a non-cementitious tile adhesive In certain embodiments, the construction material comprising hydrophobic, multi-cellular inorganic particulate material having a crush strength greater than about 1500 kPa in construction materials, has advantageous stability properties, for example, viscosity or density profile over time. In certain embodiments, the construction material has advantageous viscosity and/or density properties, that is, a resistance to viscosity and/or density changes over time. For example, the tendency of the viscosity of a construction material to change, i.e., reduce, over time, may be ameliorated or eradicated by incorporation of a hydrophobic, optionally multi-bubble, inorganic particulate material, while at the same time providing a construction material having advantageous crush strength and light-weighting properties.

In certain embodiments, the viscosity of the construction material, for example, a base coat for an ETICS, does not change, e.g., decrease, by more than about 20% over a 28 day period, for example, by no more than about 15%, or by no more than about 10% or by no more than about 5%, or by no more than about 2%, or by no more than about 1%, or does not change.

In certain embodiments, the density of the construction material, for example, a base coat for an ETICS, does not change by more than about 25% over a 28 day period, for example, by no more than about 20%, or by no more than about 17%. In certain embodiments, the density of the construction material comprising hydrophobic, multi-cellular inorganic particulate material having a crush strength greater than about 1500 KPa, changes by no more than about 0.2 g/cm³ after 28 days, for example, by no more than about 0.15 g/cm³ after 28 days.

Preparative Methods

Construction materials in accordance with certain embodiments of the present invention may be made by any conventional methods of preparing construction materials, for example, any conventional methods of making wall putties, tile adhesives, joint compounds, materials used in ETICS such as ETICS base layers or base coats, and the like. Before, during or after incorporation of the inorganic particulate material, any additional components may be added to the construction material. In certain embodiments the method of making a construction material comprises combining a hydrophobic, optionally multi-cellular, inorganic particulate material having a crush strength of at least 1500 kPa with other components of the construction material, and forming the construction material therefrom. Any known methods of manufacturing construction materials may be used.

Test Methods

Crush Strength Test Method

This test measures the pressure required to crush a bed of material, held within a steel die set, by 30% of its original volume.

60 cm³ of sample is measured and transferred into the cylindrical die. The die has an internal diameter of 50.65 and an internal height of 60.9 mm. The die is gently shaken on a flat surface for 10 seconds to 'pack' the material down in the die. A piston (having a diameter complimentary to the diameter of the die) is placed gently on top of the sample in the die.

The height of the piston protruding above the top of the die is measured with a digital micrometer and recorded, which enables the bed depth of the sample before compression to be calculated.

A tensometer is set up with a 10 kN load cell fitted with clamp holder but no clamp. The die set with sample and piston is then placed under the cross-head of the tensometer and the cross-head is driven down so it is close to the top of the piston. position in a tensometer.

The pressure is monitored as the piston is gradually driven into the die. The measurement is monitored and data analysed using Qmat software. The pressure at 30% volume compression is then obtained.

Bulk Density Test Method

The bulk density of a substance is the value obtained when the mass of the substance is divided by its contained volume, after the substance has been subjected to conditions of free pouring.

The test may be carried out on powders and granular materials. The materials are usually tested without prior drying, providing the material pours freely. The condition of free pouring is defined by the height of fall and the contained volume. The grain size of the test material is limited by the diameter of the funnel stem (see apparatus below).

Apparatus (ISO9001 Compliant)
funnel, internal diameter 11 cm, stem diameter 1 cm, length 12 cm
containing vessel; internal diameter 2.5 cm, depth 10 cm
balance; capable of weighing 1000 g to 0.01 g
retort stand, clamp and boss
straight edge
ruler to measure 7 cm Method
attach funnel to the retort stand
tare the weight of the containing vessel
place the containing vessel under the funnel
adjust the clamp and boss so that the stem of the funnel is vertical and its end 7 cm above the top of the containing vessel
pour the test material into the funnel until the containing vessel overflows
level the test material across the top of the containing vessel with the straight edge
weigh and record the net weight of the test material Expression of Results
bulk density (BD) is expressed as g/cm³ and is calculated as follows:

$$BD=W/V$$

where W is the net weight of the test material recorded, and V is the volume of the containing vessel.

Apparent Density Test Method

The apparent density of a substance is the mass of the substance divided by its volume using water (for non-hydrophobic) as the displacing medium. Temperature control at room temperature is adequate providing the room temperature is between 20° C. and 27° C. If the room temperature falls outside of this range a temperature controlled water bath will be required to provide constant temperature.

Apparatus (ISO90001 Compliant)
specific gravity bottles (numbered)
balance capable of weighing 100 g to within 0.001 g
oven, capable of maintain temperature of 100° C.+/−5° C.
wash bottle
constant temperature room or water bath, controlled to within +/−3° C.

Method
select a specific gravity bottle with matching stopper and ensure that it is clean and dry
insert the stopper into the bottle and weigh and record the weight of the bottle (W1)
add approximately 2 g of dried powder (inorganic particulate material) to the bottle, insert the stopper, weigh and record the weight of the bottle plus contents (W2)
place the specific gravity bottle and contents in a desiccator and evacuate it for at least 1 hour
remove the bottle from the desiccator and fill it with distilled water, replacing the stopper gently, so as not to cause a bubble to form in the neck of the bottle, and wipe the water displaced by the stopper from the sides of the bottle and leave it to stand on the bench for at least 1 hour (NOTE: If the room is not temperature controlled place the bottle and contents in a water bath controlled at 25° C. for 1 hour)
ensure the bottle is dry and weigh it together with its contents, and record the weight (W3)
empty the specific gravity bottle and clean it out thoroughly, then fill it with distilled water, replacing the stopper and stand the bottle on the bench for at least 1 hour (NOTE: If the room is not temperature controlled place the bottle and contents in a water bath controlled at 25° C. for 1 hour).
ensure the outside of the bottle is dry, and weigh the bottle and contents and record the weight (W4)

Expression of Results

The apparent powder density is expressed as g/cm$^3$ and is calculated as follows:

Apparent density=[(weight of sample)×(density of water)]/[(weight of water)−(weight of water used)]

Thus, from the top part of the above expression=(W2−W1)×(density of water). Let this be A.

Density of water at 25° C.=0.997 g/cm$^3$.
Density of water at 23° C.=0.998 g/cm$^3$.

From the lower part of the above expression (W4−W1)−(W3−W2). Let this be B.

Apparent density=A/B

Imhoff Sedimentation Test Method

To assess sedimentation, an Imhoff funnel is filled with 500 ml of water and 5 g of sample is added to the funnel and mixed with a stirring rod. The volume is made up to 1000 ml with water and the amount of sedimentation noted after the specified times.

Penetrometer Viscosity Over Time Test Method

A Cone Penetrometer (Mastrad 650 machine) is used to measurement viscosity properties at particular time intervals. The method comprises positioning the cone above the surface of the material being tested, which is smoothed, and then the cone is plunged into the material and the penetration depth is measured.

Density Over Time Test Method

Density measurements were determined in accordance with BS EN ISO 2811-1; 2016 Determination of Density Pycnometer method.

EXAMPLES

Example 1

Inorganic particulate material samples were prepared as shown in Table 1. PM No. 1, PM No. 2 and PM No. 3 are multi-bubble perlite microsphere samples. CPM No. 1, CPM No. 2 and CPM No. 3 are the PM No. 1, 2 and 3 particulate with an additional hydrophobic coating. (0.1 wt. % of octytriethoxysilane).

TABLE 1

|  | PM No.1 | PM No. 2 | PM No. 3 |
|---|---|---|---|
| $d_{10}$ (μm) | 103 | 102 | 84 |
| $d_{50}$ (μm) | 154 | 185 | 245 |
| $d_{90}$ (μm) | 216 | 271 | 362 |
| $d_{98}$ (μm) | 265 | 337 | 448 |
| Water absorption (ml/100 ml)—uncoated | 48 | 47 | 55 |
| Water absorption (ml/100 ml)—coated | npm | npm | npm |
| Crush Strength (kPa @ 30%) | 4000 +/− 200 | 2400 +/− 200 | 1900 +/− 300 |
| Apparent density (g/cm$^3$) | 0.86 | 0.63 | 0.75 | npm = not possible to measure (i.e., no water absorbed)

Each sample was tested using the Imhoff sedimentation testing method, with results shown in Table 2.

TABLE 2

| Sedimentation Time | PM No. 1 ml sediment | PM No. 2 ml sediment | PM No. 3 ml sediment | Coated PM No. 1 ml sediment | Coated PM No. 2 ml sediment | Coated PM No. 3 ml sediment |
|---|---|---|---|---|---|---|
| 3 mins | 1.0 | 0.8 | 1.5 | 0.05 | 0 | 0 |
| 5 mins | 1.1 | 0.9 | 1.7 | 0.05 | 0 | 0 |
| 1 hour | 1.3 | 1.1 | 2.1 | 0.05 | 0 | 0 |
| 24 hours | 1.3 | 1.3 | 3 | 0.05 | 0 | 0 |
| 48 hours | 1.7 | 1.5 | 4 | 0.05 | 0 | 0 |
| 168 hours |  |  |  | 0.3 | 0.05 | 0.2 |
| 336 hours |  |  |  | 0.5 | 0.1 | 0.3 |
| 504 hours |  |  |  | 0.6 | 0.2 | 0.5 |
| 672 hours |  |  |  | 0.7 | 0.2 | 0.5 |

Example 2

Base coat formulations for an ETICS were made up using low shear dispersion equipment. The formulations were made up containing 0.55 wt. % of a cellulose thickener of the total formulation. Apart from comparative example 1, the inorganic particulate material was added at an amount of 5 wt. %. Comparative Example 1 does not contain any lightweight inorganic particulate material and instead contains $CaCO_3$ particulate having a density of 2.7 $g/cm^3$. The formulations are summarized in Table 3 below.

TABLE 5

|  | Sample No. 1 | Sample No. 2 | Sample No. 3 | Sample No. 4 |
|---|---|---|---|---|
| Perlite | PM No. 4 | PM No. 4 | PM No. 4 | PM No. 4 |
| Coating | PDMS | PDMS | Oc Si | None |
| Amount of coating | 0.5 wt. % | 0.1 wt. % | 0.1 wt. % | — |
| Data points on graph | ♦ | ■ | ▲ | ● |

TABLE 3

|  | Comparative Example 1 | Formulation 1 | Formulation 2 | Comparative Example 2 | Comparative Example 3 | Formulation 3 | Formulation 4 |
|---|---|---|---|---|---|---|---|
| Inorganic particulate material | None | PM1 | PM2 | Uncoated cenospheres | Foamed glass | CPM1 | CPM2 |
| Inorganic particulate material density ($g/cm^3$) | — | 0.63 | 0.5 | 0.66 | 1.29 | 0.63 | 0.5 |
| Amount of inorganic particulate material | 0.00 | 5.00 | 5.00 | 5.00 | 5.00 | 5.00 | 5.00 |
| Theoretical Density ($g/cm^3$) | 1.96 | 1.75 | 1.69 | 1.77 | 1.89 | 1.75 | 1.69 |

Each formulation underwent viscosity and density tests. The results of the tests are provided in Table 4. The following testing methods were used to evaluate the formulations. Both tests were carried out at room temperature following conditioning at 50° C. to accelerate aging.

Example 3

Figure 2:
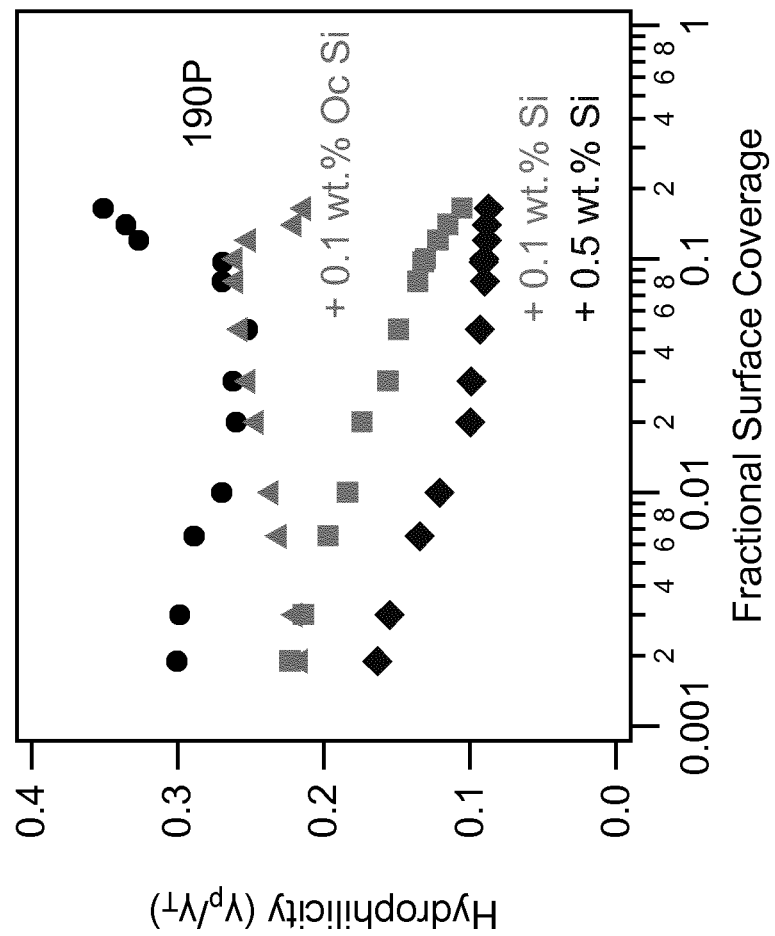
FIG. 2 is a graph summarizing the data generated in Example 3.

Coated inorganic particulate material samples were prepared as shown in Table 5. PM No. 4 is a multi-bubble perlite microsphere particulate material ($d_{10}$=100 μm; $d_{50}$=150 μm, $d_{90}$=210 μm). The hydrophilicity index of each sample was tested in accordance with the 'Hydrophilicity index test method'. Results are summarised in FIG. 2, in which 'Si' means polydimethylsiloxane (PDMS) emulsion, 'Oc Si' means octyltriethoxysilane and '190P' is uncoated PM No. 4.

TABLE 4

| Time (hours) | Comparative Example 1 | Formulation 1 | Formulation 2 | Comparative Example 2 | Comparative Example 3 | Formulation 3 | Formulation 4 |
|---|---|---|---|---|---|---|---|
| Viscosity (mm) | | | | | | | |
| 0 | 335 | 346 | 348 | 329 | 332 | 350 | 348 |
| 24 | 338 | 300 | 300 | 320 | 265 | 341 | 318 |
| 168 | 341 | 285 | 290 | 312 | 244 | 342 | 314 |
| 336 | 325 | 298 | 292 | 320 | 237 | 343 | 325 |
| 672 | 335 | 275 | 264 | 302 | 145 | 350 | 318 |
| Total viscosity reduction | 0.00 | 71.00 | 84.00 | 27.00 | 187.00 | 0.00 | 30.00 |
| Density ($g/cm^3$) | | | | | | | |
| 0 | 1.609 | 1.353 | 1.301 | 1.449 | 1.514 | 1.322 | 1.287 |
| 24 | 1.641 | 1.460 | 1.414 | 1.473 | 1.688 | 1.367 | 1.386 |
| 168 | 1.663 | 1.539 | 1.505 | 1.455 | 1.736 | 1.363 | 1.354 |
| 336 | 1.643 | 1.522 | 1.487 | 1.482 | 1.780 | 1.367 | 1.401 |
| 672 | 1.640 | 1.578 | 1.540 | 1.525 |  | 1.362 | 1.417 |
| Total density reduction | −0.031 | −0.225 | −0.239 | −0.076 | 1.514 | −0.040 | −0.130 |

The invention claimed is:

1. A construction material comprising hydrophobic, inorganic particulate material, wherein the hydrophobic inorganic particulate material:
   (i) is a multi-cellular inorganic particulate material or a spherical perlite comprising microspheres,
   (ii) has a $d_{10}$ of at least about 50 μm, a $d_{50}$ of at least about 100 μm, and a $d_{90}$ of at least about 160 μm, and
   (iii) has a crush strength of at least about 1500 kPa;

wherein a viscosity or density of the construction material does not change by more than about 20% over a 28 day period.

2. A construction material comprising hydrophobic, inorganic particulate material, wherein the hydrophobic inorganic particulate material:
(i) is a multi-cellular inorganic particulate material or a spherical perlite comprising microspheres,
(ii) has a $d_{10}$ of at least about 50 μm, a $d_{50}$ of at least about 100 μm, and a $d_{90}$ of at least about 160 μm, and
(iii) has a crush strength of at least about 1500 kPa;
wherein the construction material is a wall putty, tile adhesive, joint compound, or Exterior Thermal Insulating Composite Systems.

3. A construction material according to claim 2, wherein the wall putty or tile adhesive are ready-to-use or ready-to-mix.

4. A method of making a construction material, the method comprising:
combining a hydrophobic, multi-cellular, inorganic particulate material with one or more further components of the construction material, and
forming the construction material therefrom,
wherein the hydrophobic, multi-cellular, inorganic particulate material has a crush strength of at least 1500 kPa, a $d_{10}$ of at least about 50 μm, a $d_{50}$ of at least about 100 μm, and a $d_{90}$ of at least about 160 μm.

5. A construction or building comprising a construction material comprising hydrophobic, inorganic particulate material, wherein the hydrophobic inorganic particulate material:
(i) is a multi-cellular inorganic particulate material or a spherical perlite comprising microspheres,
(ii) has a $d_{10}$ of at least about 50 μm, a $d_{50}$ of at least about 100 μm, and a $d_{90}$ of at least about 160 μm, and
(iii) has a crush strength of at least about 1500 kPa.

6. A method comprising incorporating a hydrophobic, multi-cellular, inorganic particulate material having a crush strength of at least 1500 kPa a $d_{10}$ of at least about 50 μm, a $d_{50}$ of at least about 100 μm, and a $d_{90}$ of at least about 160 μm in a construction or building.

* * * * *